Jan. 28, 1964
A. S. PEARSON
3,119,476
FASTENER DEVICES
Filed Sept. 1, 1961
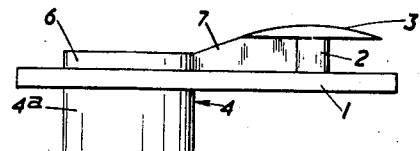
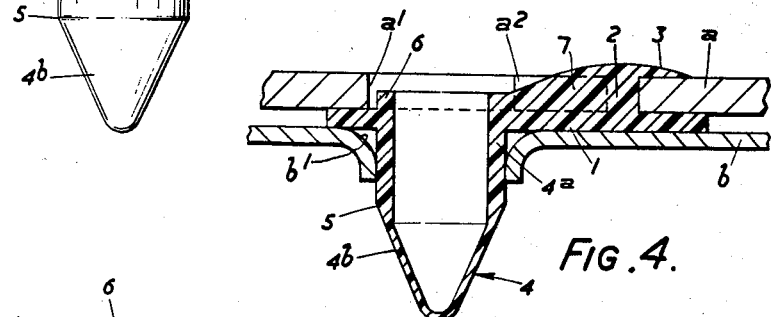
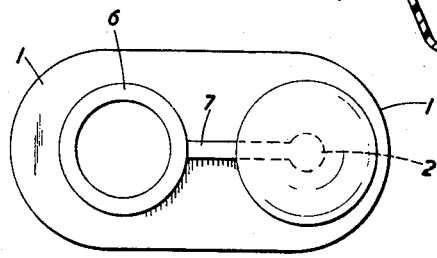
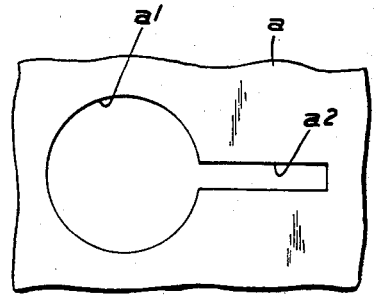
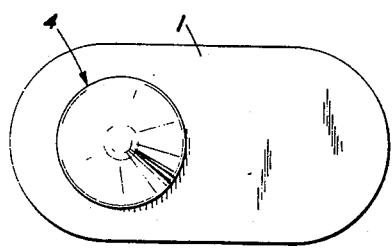
INVENTOR
ARTHUR STANLEY PEARSON,
BY *Walter S. Jones*
ATTORNEY

United States Patent Office 3,119,476
Patented Jan. 28, 1964

3,119,476
FASTENER DEVICES
Arthur Stanley Pearson, Sherwood, Nottingham, England, assignor to United-Carr Fastener Corporation, Boston, Mass., a corporation of Delaware
Filed Sept. 1, 1961, Ser. No. 135,515
Claims priority, application Great Britain Sept. 2, 1960
2 Claims. (Cl. 189—88)

This invention relates to fastener devices for securing a panel to a support, for example a trim pad lining panel for a motor car to a support which is part of the motor car body.

The present invention provides a fastener device for securing an apertured panel to an apertured support, said device being formed from resilient material and comprising a base having a boss extending from one face, a flange projecting from the boss in spaced parallel relation to the base, such that when the device is inserted into an aperture in the panel said flange and base engage opposite faces of the panel to retain the device, the base and panel in assembly, the base being provided with a resilient stud extending from the opposite face thereof to the boss for resilient engagement in an aperture in the support.

The fastener device may be used in conjunction with a support whose aperture comprises an aperture through which the lateral flange of the device can be passed and a slot in communication with the aperture, so that the device can be assembled with the panel by inserting the flange through the aperture and moving the boss along the slot to position the flange and base on opposite sides of the panel.

The fastener device may have a rib projecting from the said one side of the base and situated between the boss and the stud portion so that the rib can be positioned in the slot in the panel to restrict twisting of the panel relative to the fastener device.

The said one side of the base may be formed with a neck which enters the hole in the panel after the boss has been moved into the slot to restrict movement of the boss in the slot by abutting the edge of the hole.

To enable the invention to be fully understood it will now be described by way of example, with reference to the accompanying drawing in which:

FIG. 1 is a side view of a fastener device according to one embodiment of the invention;
FIG. 2 is a plan view;
FIG. 3 is an under plan view;
FIG. 4 is a sectional view of a fastener assembly, and
FIG. 5 is a plan view of a panel to be secured to a support.

As shown in the accompanying drawing the fastener device is made from resilient synthetic plastic material and includes a plate-like base 1 from one side of which projects an integral boss 2. A circular or rectangular flange 3 projects laterally from and is integral with the end of the boss remote from the base so that the flange is in spaced parallel relation to the base.

An integral hollow stud portion 4 projects from the opposite side of the base in lateral spaced relation to the boss. The stud has a circular cross section and includes a portion 4a extending from the base with an increasing diameter for approximately half the length of the stud to a medial point 5, and an end portion 4b which tapers with a decreasing diameter from the point 5 to the closed free end of the stud.

The thickness of the wall of the portion 4a is greater than the thickness of the wall of the end portion 4b.

The stud is extended through the base from the base to provide a neck 6 which projects from the said one side of the base for a short distance.

A rib 7 is provided on the base and is integrally connected therewith and extends from the neck 6 to the boss 2, the upper edge of the rib sloping upwardly from the neck to the boss. The width of the rib 7 is slightly less than the diameter of the boss 2.

The panel $a$ to be secured to the support $b$ has a circular aperture $a^1$ having a diameter larger than the flange 3 of the fastener device and a slot $a^2$ extending from the aperture in a radial direction, the slot having a width slightly less than the diameter of the boss 2. The support $b$ has a circular aperture $b^1$ whose diameter is smaller than the maximum diameter of the stud 4.

To secure the panel to the support, the fastener device is first assembled with the panel $a$ by inserting the flange 3 through the aperture $a^1$ and forcing the boss 2 along the slot $a^2$ until the boss abuts the end of the slot with the flange 3 and base 1 in engagement with opposite faces of the panel. The fastener device, which is flexed during this operation, resiliently returns to its normal shape and the neck 6 enters into the aperture $a^1$ in the panel $a$.

The panel $a$ and assembled fastener device are then assembled with the support $b$ by inserting the stud 4 into the aperture $b^1$ in the support. As the stud is being inserted, the wall of the portion 4a flexes inwardly until the point of greatest diameter 5 has passed through the aperture, whereupon the wall of the portion 4a resiliently engages the edge of the aperture and retains the stud therein, at the same time sealing the aperture.

The presence of the neck in the aperture in the panel $b$ restricts the movement of the boss 2 in the slot since the neck will abut the edge of the aperture after a predetermined movement of the boss in the slot. The rib 7 strengthens the fastener device and in its position in the slot, prevents twisting movement of the panel relative to the fastening device.

If desired, the stud of the fastening device may be formed with a peripheral shoulder facing towards the base and which, when assembled with the support, abuts the opposite side of the support to that on which the base of the fastener device is located.

The panel $a$ may comprise a trim pan lining to be secured to a support $b$ forming part of the body of a motor vehicle.

I claim:
1. The combination of a fastening device, a panel and a support, said fastening device comprising a base having a boss extending from one face, a flange projecting laterally from said boss in spaced parallel relationship to said base and a resilient stud projecting from the opposite face of said base to said boss, an inner wall formed in said panel defining a keyhole aperture and said flange and a portion of said base engaging opposite surfaces of said panel adjacent said inner wall and said support having an engaging wall defining an aperture, said stud frictionally associated with said engaging wall.

2. A panel fastener device formed of resilient material comprising a base having a boss extending from one face thereof, a flange projecting laterally from said boss in spaced parallel relationship with said base and a resilient stud having an external surface free of projections projecting from the opposite face of said base to said boss, a portion of said stud forming a stud wall defining an aperture through said base and a rib extending from said wall to said boss, said stud wall having a portion extending from said base in a direction opposite to said stud.

References Cited in the file of this patent
UNITED STATES PATENTS
418,688    Converse _____ Jan. 7, 1890
2,896,889  Hershberger _____ July 28, 1959
3,001,257  Girodet _____ Sept. 26, 1961